(12) United States Patent
Karaoguz et al.

(10) Patent No.: US 11,263,468 B2
(45) Date of Patent: Mar. 1, 2022

(54) ELECTRONIC DEVICE AND METHOD FOR MONITORING A SCENE VIA A SET OF ELECTRONIC SENSOR(S), RELATED COMPUTER PROGRAM

(71) Applicant: TRANSDEV GROUP, Issy les Moulineaux (FR)

(72) Inventors: Cem Karaoguz, Palaiseau (FR); Hoang-Lan Pham, L'Hay les Roses (FR); Alexis Beauvillain, Massy (FR); Olivier Le Cornec, Palaiseau (FR)

(73) Assignee: TRANSDEV GROUP INNOVATION, Issy-les-Moulineaux (FR)

( * ) Notice: Subject to any disclaimer, the term of this patent is extended or adjusted under 35 U.S.C. 154(b) by 225 days.

(21) Appl. No.: 16/656,370

(22) Filed: Oct. 17, 2019

(65) Prior Publication Data

US 2020/0125875 A1 Apr. 23, 2020

(30) Foreign Application Priority Data

Oct. 17, 2018 (FR) ..................... 18 59605

(51) Int. Cl.
*G06K 9/20* (2006.01)
*G06K 9/00* (2006.01)
(Continued)

(52) U.S. Cl.
CPC ............ *G06K 9/2054* (2013.01); *G01S 13/89* (2013.01); *G01S 13/91* (2013.01); *G01S 17/89* (2013.01);
(Continued)

(58) Field of Classification Search
CPC ............ G06K 9/2054; G06K 9/00785; G06K 9/6288; G01S 13/89; G01S 13/91; G01S 17/89; G08G 1/04
See application file for complete search history.

(56) References Cited

U.S. PATENT DOCUMENTS

2019/0353778 A1* 11/2019 Slutsky ................ G01S 13/931
2021/0131823 A1* 5/2021 Giorgio ................ G01S 17/86

FOREIGN PATENT DOCUMENTS

WO 2015185846 A1 12/2015

OTHER PUBLICATIONS

Lobo et al, "Bayesian 3D Independent Motion Segmentation with IMU-aided RBGD Sensor", 2012, IEEE International Conference on Multisensor Fusion and Integration for Intelligent Systems (MFI), pp. 445-450 (6 pages) (Year: 2012).*

(Continued)

*Primary Examiner* — David F Dunphy
(74) *Attorney, Agent, or Firm* — Knobbe, Martens, Olson & Bear, LLP

(57) ABSTRACT

An electronic device for monitoring a scene via a set of sensor(s) includes an acquisition module, of at least one representation of the scene via the sensor set, and a module for converting each representation into a respective occupancy grid. Each grid includes several zones, each corresponding to a respective portion of the representation, and each zone being in an occupied state if said portion contains an object and in an unoccupied state otherwise. The device also includes a module for calculating a differential grid corresponding to a difference between a current occupancy grid and a reference occupancy grid, by ignoring each zone of the reference grid which is in the occupied state and for which the corresponding zone of the current grid is in the unoccupied state, and a module for detecting a change in the scene, starting from the differential grid.

11 Claims, 9 Drawing Sheets

(51) Int. Cl.
  *G06K 9/62* (2006.01)
  *G08G 1/04* (2006.01)
  *G01S 17/89* (2020.01)
  *G01S 13/89* (2006.01)
  *G01S 13/91* (2006.01)

(52) U.S. Cl.
  CPC ....... *G06K 9/00785* (2013.01); *G06K 9/6288* (2013.01); *G08G 1/04* (2013.01)

(56) References Cited

OTHER PUBLICATIONS

Andrei Vatavu et al., "Real-Time environment representation based on Occupancy Grid temporal analysis using a Dense Stereo-Vision System", Intelligent Computer Communication and Processing (ICCP), 2010 IEEE International Conference on, IEEE, Piscataway, NJ, USA, Aug. 26, 2010, pp. 203-209, XP031778203, ISBN 978-1-4244-8228-3.
Search Report for French Application No. FR1859605 dated Aug. 14, 2019 in 2 pages.
Piccardi, Massimo, "Background subtraction techniques: a review", 2004 IEEE International Conference on Systems, Man and Cybernetics, pp. 3099-3104.
Meagher, Donald J.R., Octree Encoding: A New Technique for The Representation, Manipulation and Display of Arbitrary 3-D Objects by Computer, Technical Report Image Processing Laboratory, IPL-TR-80-111, Oct. 1980.
Written Opinion for French Application No. FR1859605 in 5 pages.

\* cited by examiner

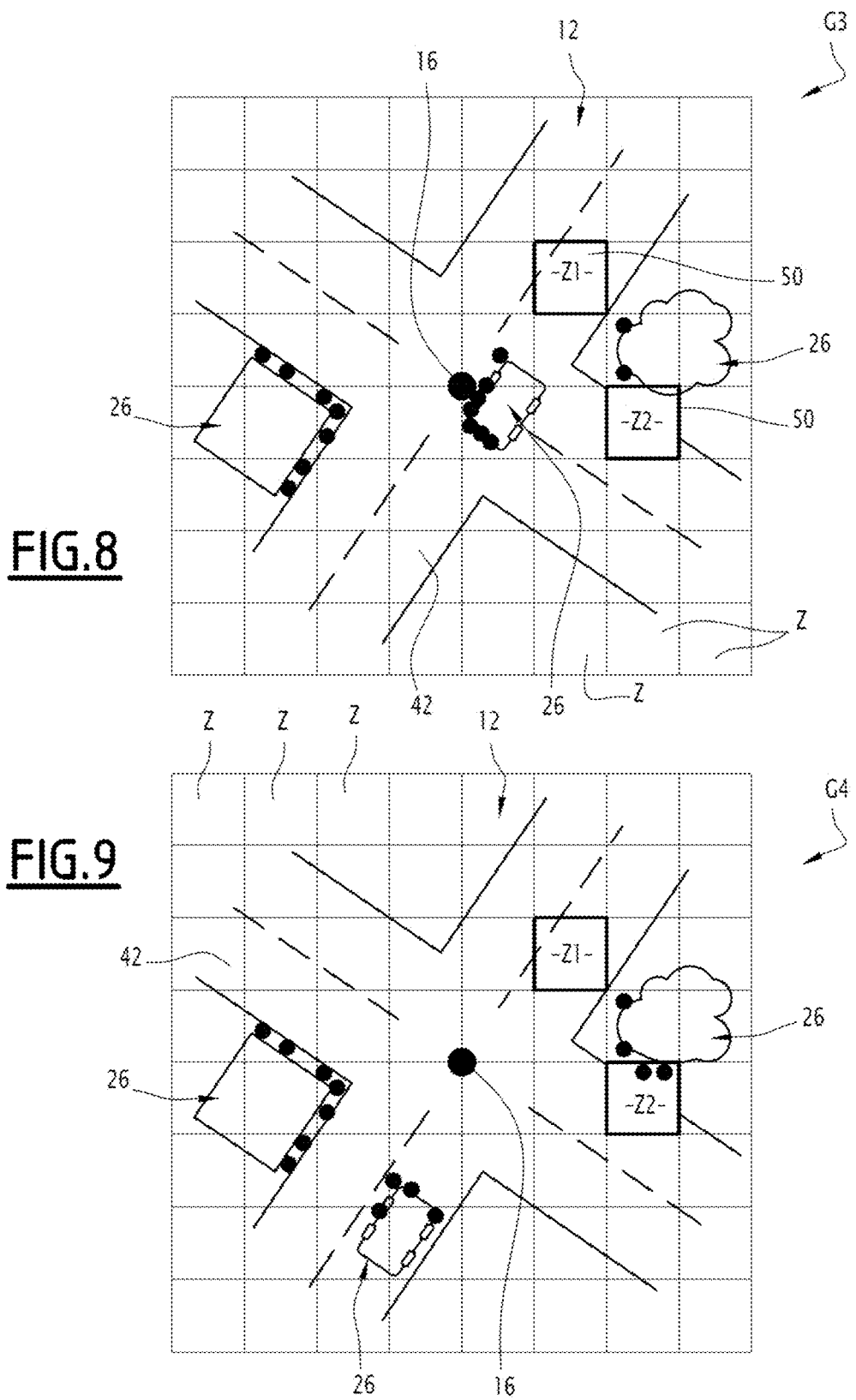

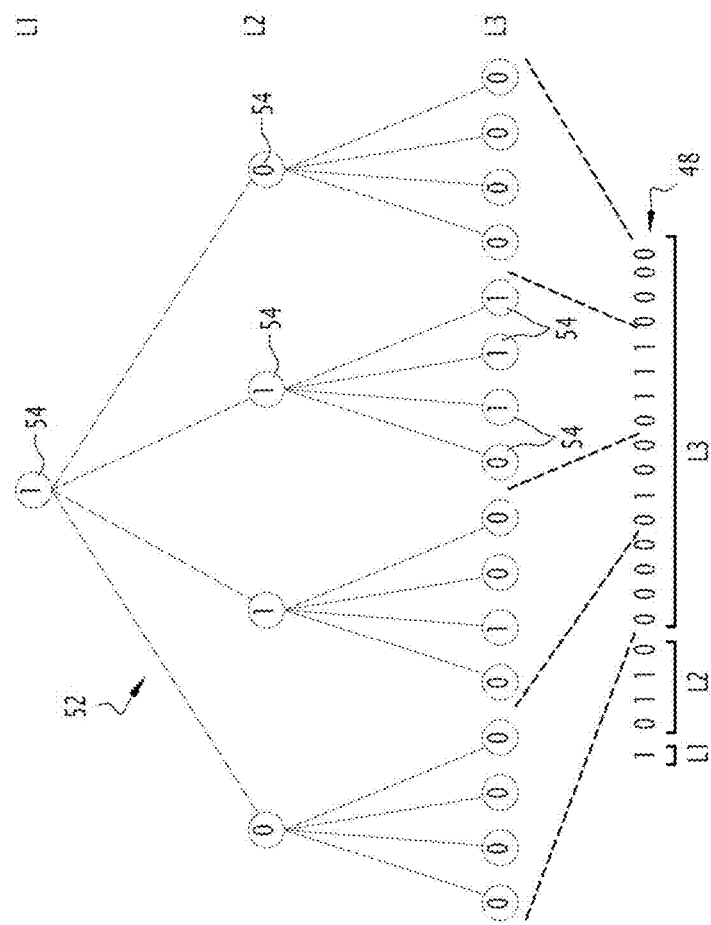
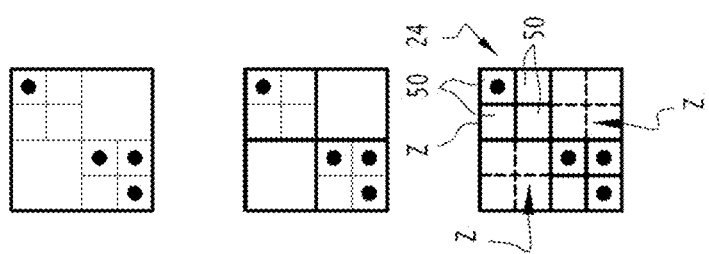
FIG.14

ELECTRONIC DEVICE AND METHOD FOR MONITORING A SCENE VIA A SET OF ELECTRONIC SENSOR(S), RELATED COMPUTER PROGRAM

CROSS-REFERENCE TO RELATED APPLICATIONS

This application is a U.S. non-provisional application claiming the benefit of French Application No. 18 59605, filed on Oct. 17, 2018, which is incorporated herein by reference in its entirety.

FIELD

The present invention relates to an electronic device for monitoring a scene via a set of N electronic sensor(s), such as a stereoscopic camera, a radar or a laser remote sensing device, better known under the name lidar (light detection and ranging). N is an integer greater than or equal to 1.

The invention also relates to a method for monitoring the scene via the set of N electronic sensor(s), the method being implemented by such an electronic monitoring device.

The invention also relates to a non-transitory computer-readable medium including a computer program comprising software instructions which, when executed by a computer, implement such a monitoring method.

The invention relates, in particular, to the field of monitoring a road infrastructure where vehicles, cyclists and pedestrians are intended to circulate, including autonomous motor vehicles, particularly autonomous motor vehicles having a level of automation greater than or equal to 3 according to the scale of the International Organization of Motor Vehicle Manufacturers (OICA). The monitored scene then forms all or part of the road infrastructure.

BACKGROUND

In the field of monitoring a road infrastructure, it is particularly important to be able to detect one or more changes within the infrastructure using one or more electronic sensors, such as stereoscopic cameras, radars, lidars etc. This monitoring aims to detect changes over a period of time of variable duration, typically ranging from a few seconds to several hours, or even days or weeks, the changes likely to be detected being for example:
 moving objects,
 degradations (e.g. holes) of the road condition of the road infrastructure,
 obstacles blocking entrances/exits of the road infrastructure,
 obstacles (e.g. fallen trees, snow accumulation) blocking a road segment of the road infrastructure,
 recently occupied or vacated road infrastructure parking spaces,
 illegal parking within the road infrastructure.

It is then known to seek to detect such changes via a method commonly called background subtraction, in particular when this monitoring is done using cameras. The article "*Background subtraction techniques: a review*" by Piccardi et al, in 2004 *IEEE International Conference on Systems, Man and Cybernetics* then presents a panorama of different techniques of background subtraction.

However, such background subtraction techniques are not very suitable for use with sensors other than a camera, in particular radars or lidars.

SUMMARY

The object of the invention is then to propose an electronic device and an associated method for monitoring a scene via a set of N electronic sensor(s), making it possible to more effectively detect a change in the scene, especially when the sensor is a radar or a lidar.

For this purpose, the object of the invention is an electronic device for monitoring a scene via a set of N electronic sensor(s), where N is an integer greater than or equal to 1, the device being intended to be connected to the set of N sensor(s) and comprising:
 an acquisition module configured to acquire, from the set of N sensor(s), at least one representation of the scene,
 a conversion module configured to convert each acquired representation into a respective occupancy grid, each occupancy grid comprising a plurality of zones each corresponding to a respective portion of the representation, each zone of the occupancy grid being in an occupied state if said portion contains an object, and in an unoccupied state otherwise,
 a calculation module configured to calculate a differential grid corresponding to a difference between a current occupancy grid and a reference occupancy grid, by ignoring each zone of the reference occupancy grid which is in the occupied state and for which the corresponding zone of the current occupancy grid is in the unoccupied state, and
 a detection module configured to detect a change of the scene from the calculated differential grid.

With the electronic monitoring device according to the invention, the use of respective occupancy grids, on the one hand, for the current representation of the scene, and, on the other hand, for the reference representation of the scene (i.e. the background), then the calculation of the differential grid by ignoring each occupied zone of the occupancy reference grid for which the corresponding zone of the current occupancy grid is at the same time in the unoccupied state, then makes it possible to more effectively detect a change in the scene observed by the one or more sensors, in particular to reduce the associated calculation times.

This makes it possible to detect such a change more quickly. This also makes it possible to carry out such monitoring, even when the sensor is a radar or a lidar, and even if these sensors generally deliver the measured or observed data in the form of voluminous clouds of points. The processing of such clouds of points is then generally long when using the background subtraction techniques of the prior art.

According to other advantageous aspects of the invention, the electronic monitoring device comprises one or more of the following features, taken separately or according to all technically feasible combinations:
 the calculation module is configured to calculate the differential grid by ignoring each zone of the reference occupancy grid for which the corresponding zone of the current occupancy grid is in the unoccupied state;
 the differential grid comprises a plurality of zones each corresponding to a respective portion of the representation of the scene, each zone of the differential grid being in an active state or an inactive state, the detection module being configured to detect an appearance of an object in the scene when a corresponding zone of the differential grid is in the active state;
 the calculation module is configured to calculate a respective zone of the differential grid in the active state only if the corresponding zone of the current occupancy grid is in the occupied state and if the corresponding zone of the occupancy grid reference is in the unoccupied state;

the occupancy grids and the differential grid are each in the form of a bit string, each bit being associated with a respective zone, and the calculation module is configured to calculate the differential grid according to the following table:

| $B^{cur}$ | $B^{ref}$ | $\Delta B$ |
|---|---|---|
| 0 | 0 | 0 |
| 0 | 1 | 0 |
| 1 | 0 | 1 |
| 1 | 1 | 0 | where $B^{cur}$ and $B^{ref}$ represent a bit of the current occupancy grid and respectively a corresponding bit of the reference occupancy grid, the bit 0 denoting the unoccupied state and the bit 1 denoting the occupied state, and $\Delta B$ represents the bit of the differential grid associated with the respective bits $B^{cur}$ and $B^{ref}$, the bit 0 denoting the inactive state and the bit 1 denoting the active state;

the calculation module is configured to calculate the differential grid according to the following equation:

$$\Delta P = \begin{cases} 1 & si P^{cur} - P^{ref} > \beta \\ 0 & \text{otherwise} \end{cases}$$

where $P^{cur}$ and $P^{ref}$ represent a probability that a corresponding area of the current occupancy grid is occupied, and respectively a probability that said area of the reference occupancy grid is occupied, with $0 \leq P^{cur} \leq 1$ and $0 \leq P^{ref} \leq 1$, $\Delta P$ represents the state of said zone of the differential grid associated with the respective probabilities $P^{cur}$ and $P^{ref}$, the value 0 denoting the inactive state and the value 1 denoting the active state, and $\beta$ is a decimal value strictly between 0 and 1; $0 < \beta < 1$;

the occupancy grids and the differential grid are each represented in the form of a tree, each tree comprising a plurality of nodes distributed at several levels, each node corresponding to a respective zone, a child node being connected to a single parent node of higher level; and the calculation module is further configured to apply further processing to the calculated differential grid by setting to active state each parent node having at least one child node in the active state, from the lowest level to the highest level;

the reference occupancy grid is an occupancy grid resulting from several representations acquired successively and prior to the current representation associated with the current occupancy grid, the reference occupancy grid preferably being an average of several previous occupancy grids, each resulting from a respective representation acquired prior to the current representation associated with the current occupancy grid;

N is an integer greater than or equal to 2, and the acquisition module is configured to acquire, from each sensor, at least one representation of the scene, and the conversion module being configured to convert the representations acquired by the different sensors in the respective occupancy grid for said scene, the conversion module is preferably configured for converting each acquired representation in an intermediate occupancy grid for each sensor, and to combine the intermediate occupancy grids in the respective occupancy grid for said scene.

The invention also relates to a method for monitoring a scene via a set of N electronic sensor(s), N being an integer greater than or equal to 1, the method being implemented by an electronic monitoring device intended to be connected to the set of N sensor(s), and comprising the steps of:

acquiring, from the set of N sensor(s), at least one representation of the scene, converting each acquired representation into a respective occupancy grid, each occupancy grid comprising a plurality of zones each corresponding to a respective portion of the representation, each zone of the occupancy grid being in an occupied state if said portion contains an object and in an unoccupied state otherwise, calculating a differential grid corresponding to a difference between a current occupancy grid and a reference occupancy grid, by ignoring each zone of the reference occupancy grid which is in the occupied state and for which the corresponding zone of the current occupancy grid is in the unoccupied state, and detecting a change of the scene, from the calculated differential grid.

The invention also relates to a non-transitory computer-readable medium including a computer program comprising software instructions which, when executed by a computer, implement a monitoring method as defined above.

BRIEF DESCRIPTION OF THE DRAWINGS

These features and advantages of the invention will become more apparent upon reading the description which follows, given solely by way of non-limiting example, and with reference to the appended drawings, in which:

FIGS. 6 to 9 show views illustrating the determination of a reference occupancy grid from several previous occupancy grids, each resulting from a respective representation of the scene acquired prior to the current representation associated with the current occupancy grid;

FIGS. 13 and 14 show views illustrating the representation of an occupancy grid in the form of a tree.

DETAILED DESCRIPTION

Figure 1:
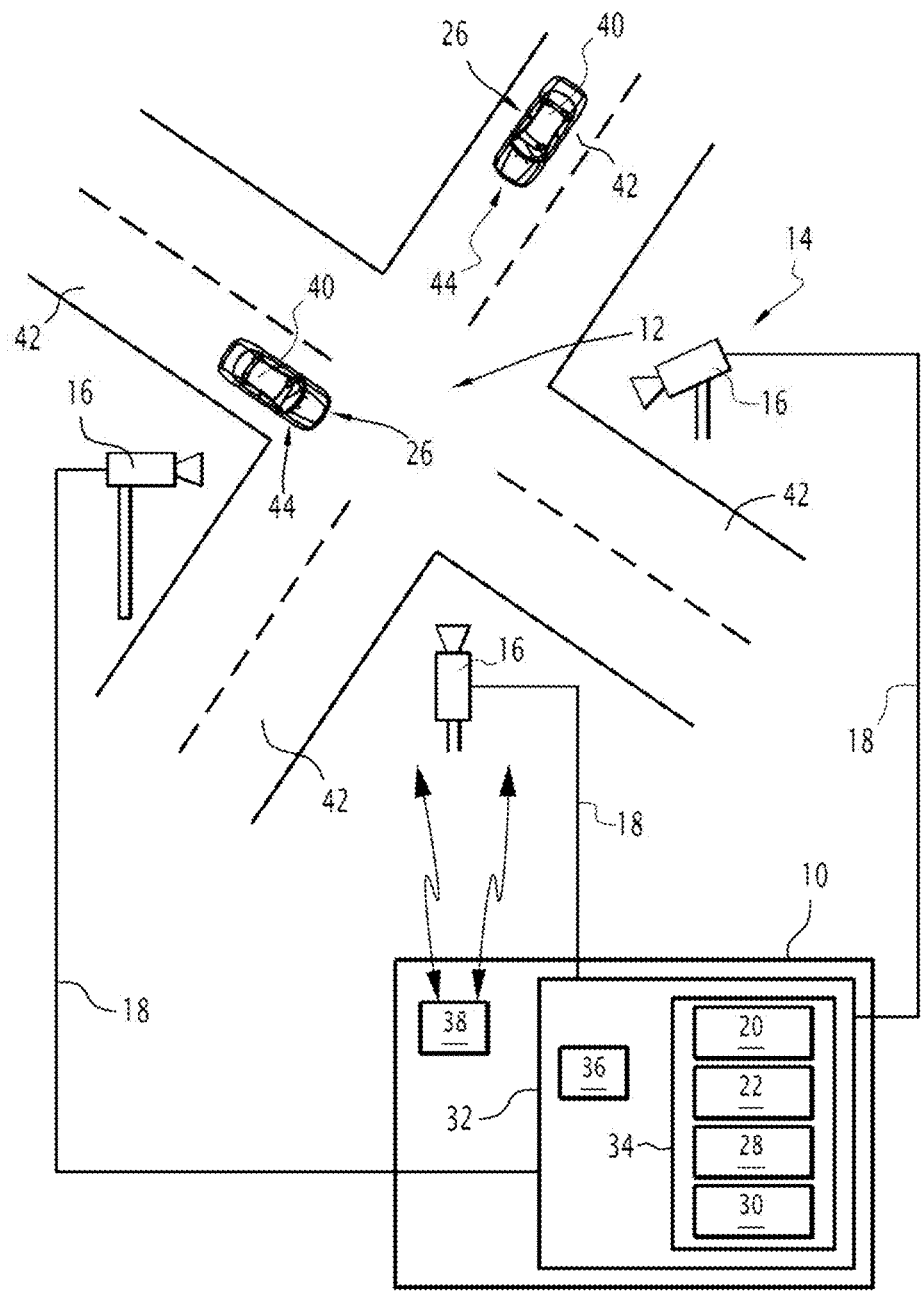
FIG. 1 shows a schematic representation of an electronic monitoring device according to the invention, configured to monitor a scene, such as a road infrastructure.

FIG. 1 shows an electronic monitoring device 10 configured to monitor a scene, such as a road infrastructure 12. The electronic monitoring device 10 is intended to be connected to a set 14 of N sensor(s) 16 via one or more data links 18.

The electronic monitoring device 10 comprises an acquisition module 20 configured to acquire, from the set 14 of N sensor(s) 16, at least one representation of the scene.

The electronic monitoring device 10 comprises a conversion module 22 configured to convert each acquired representation into a respective occupancy grid G, each occupancy grid G comprising a plurality of zones Z visible in FIGS. 3 to 12, each zone Z of the occupancy grid G being in an occupied state if said portion contains an object 26, and in an unoccupied state otherwise.

The electronic monitoring device 10 also comprises a calculation module 28 configured to calculate a differential grid $\Delta G$ corresponding to a difference between a current occupancy grid $G^{cur}$ and a reference occupancy grid $G^{ref}$.

The electronic monitoring device 10 comprises a detection module 30 configured to detect a change in the scene from the differential grid $\Delta G$ calculated by the calculation module 28.

In the example of FIG. 1, the electronic monitoring device 10 comprises an information processing unit 32 comprising, for example, a memory 34, and a processor 36 associated with the memory 34.

The electronic monitoring device 10 comprises a transceiver 38, configured, in particular, for transmitting, in the form of radio waves, data intended for one or more autonomous motor vehicles 40 located in or near the road infrastructure 12 monitored by the electronic monitoring device 10.

The road infrastructure 12 comprises one or more lanes 42, each lane 42 allowing the circulation of a traffic element 44, in particular of a motor vehicle, such as a self-driving motor vehicle 40, or alternatively a cyclist or pedestrian. In the example of FIG. 1, the road infrastructure 12 is a road intersection zone and comprises several traffic lanes 42.

Figure 3:
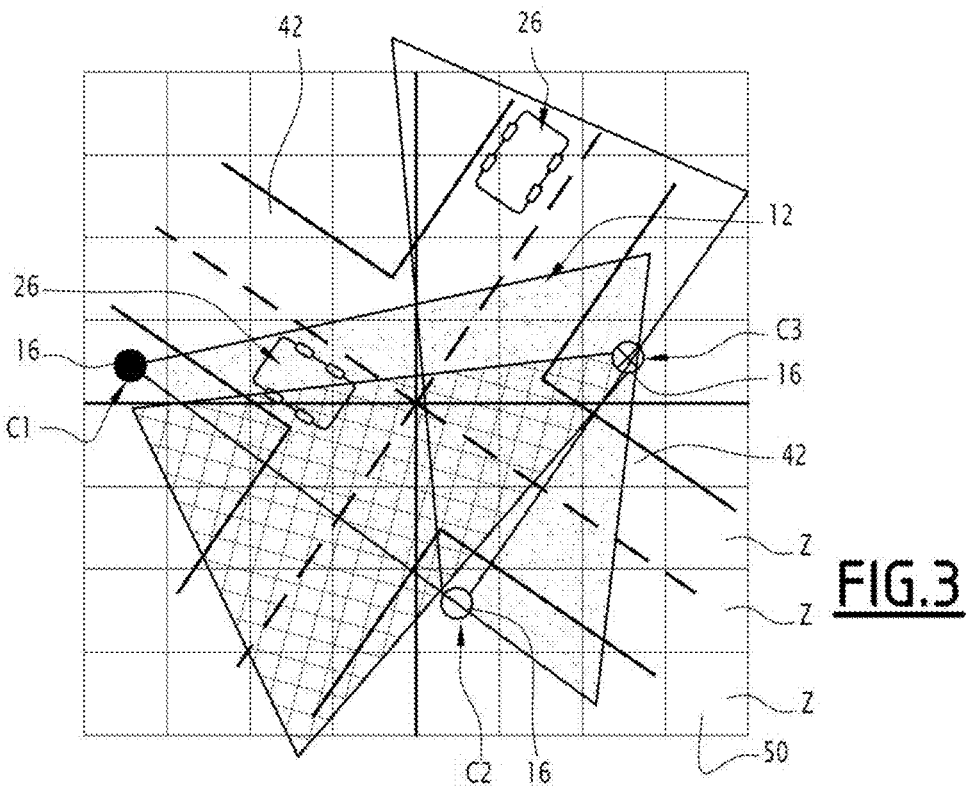
FIGS. 3 to 5 show schematic views illustrating the obtaining of an occupancy grid corresponding to the scene, from representations of the scene acquired from several electronic sensors, the occupancy grid including a plurality of corresponding zones, each of a respective portion of the representation of the scene, each area of the occupancy grid being in an occupied state if said portion contains an object, and to an unoccupied state, otherwise.
Figure 4:
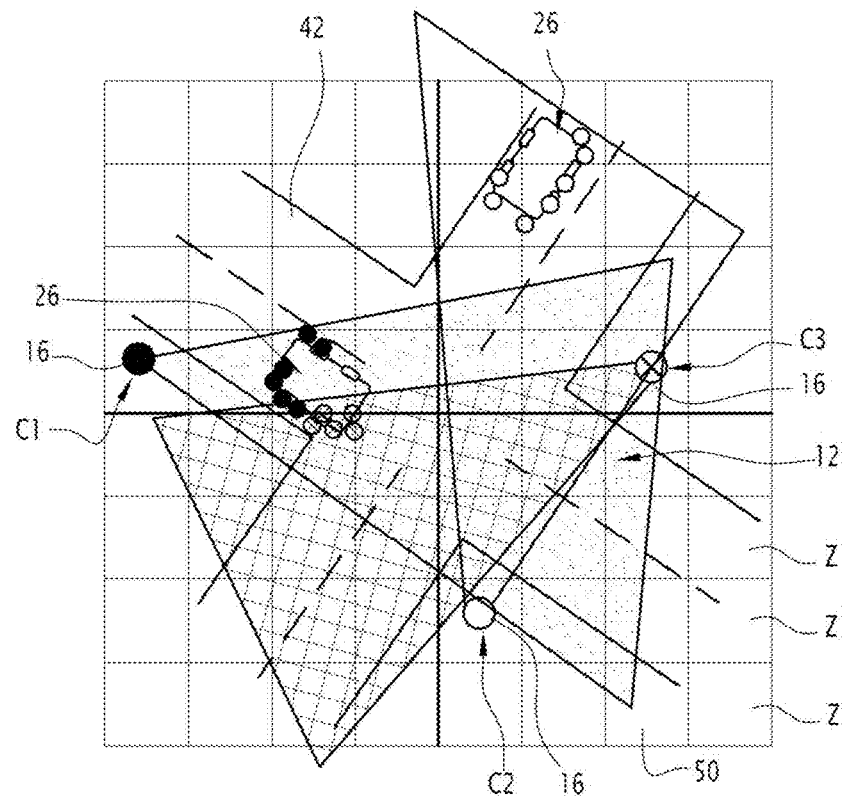

The set 14 comprises N electronic sensor(s) 16, N being an integer greater than or equal to 1. In the example of FIGS. 1, 3 and 4, the set 14 comprises three electronic sensors 16, and N is then equal to 3. In the example of FIGS. 6 to 9, the set 14 comprises a single electronic sensor 16, and N is then equal to 1.

Each electronic sensor 16 is, for example, a remote sensing device laser, better known as lidar (light detection and ranging), or radar (radio detection and ranging), or a stereoscopic camera. Each electronic sensor 16 is known per se.

Those skilled in the art will understand that the electronic sensor(s) 16 of the set 14 are, for example, all of the same type, for example all lidars, all radars, or all stereoscopic cameras.

Alternatively, the set 14 comprises a mixture of different types of electronic sensors 16, with, for example, at least two distinct types among lidar, radar and stereoscopic cameras. This variant makes it possible to have a redundancy of types of electronic sensors 16, and thus offers higher reliability.

Each sensor 16 is, for example, disposed in the vicinity of or within the scene to be monitored, such as near or inside the road infrastructure 12. Each sensor 16 is arranged along a path 42 in the example of FIG. 1.

Those skilled in the art will generally understand that the number of sensors 16, whether lidar(s), radar(s) or stereoscopic camera(s), is chosen according to the scene to be monitored, and, for example, in agreement with the number of lanes 42 forming the road infrastructure 12.

Each sensor 16 is then able to perform one or more measurements to deliver a representation of the scene to the corresponding acquisition module 20.

Each data link 18 between a respective electronic sensor 16 and the electronic monitoring device 10 may be, for example, a wire link, as in the example of FIG. 1, or a wireless link, such as a radio link.

In the example of FIG. 1, the acquisition module 20, the conversion module 22, the calculation module 28 and the detection module 30 are each produced in the form of software or a software brick that is executable by the processor 36. The memory 34 of the electronic monitoring device 10 is then able to store acquisition software configured to acquire—from the set 14 of N sensor(s) 16—at least one representation of the scene, conversion software configured to convert each acquired representation into a respective occupancy grid G, calculation software configured to calculate the differential grid $\Delta G$ corresponding to the difference between the current occupancy grid $G^{cur}$ and the reference occupancy grid $G^{ref}$ and detection software configured to detect a change in the scene from the differential grid $\Delta G$ calculated by the calculation software. The processor 36 is then able to execute each software program among the acquisition software, the conversion software, the calculation software, and the detection software.

In a variant not shown, the acquisition module 20, the conversion module 22, the calculation module 28 and the detection module 30 are each made in the form of a programmable logic component, such as an FPGA (Field Programmable Grid Array, or in the form of a dedicated integrated circuit, such as an ASIC (Application Specific Integrated Circuit), a GPU (Graphic Processing Unit), or a GPGPU (General Purpose Computing on Graphic Processing Unit).

When the electronic monitoring device 10 is made in the form of one or more software programs, it is also able to be recorded on a computer-readable medium, not shown. The computer-readable medium is, for example, a medium capable of storing the electronic instructions and being coupled to a bus of a computer system. By way of example, the readable medium may be an optical disk, a magneto-optical disk, a ROM memory, a RAM memory, any type of non-volatile memory (for example EPROM, EEPROM, FLASH, NVRAM), a magnetic card or an optical card. A computer program with software instructions is then stored on the readable medium.

In the example of FIG. 1, the acquisition module 20, the conversion module 22, the calculation module 28 and the detection module 30 are embedded within the single information processing unit 32, i.e. within one and the same electronic computer.

Alternatively, not shown, the acquisition module 20 on the one hand, and the conversion module 22, the calculation module 28 and the detection module 30, on the other hand, are separately embedded in two separate electronic computers.

According to this variant, the acquisition module 20 is, for example, disposed near the sensor(s) 16, being connected to each of the sensors 16 by a data link 18. In addition, the acquisition module 20 is, for example, built into a corresponding sensor 16.

According to this variant, the conversion module 22, the calculation module 28 and the detection module 30 are then, for example, arranged within a supervision computer, positioned at a greater distance from the sensor(s) 16. The supervision computer is, for example, a platform of a control center. In addition and optionally, the supervision computer may be connected to several acquisition modules 20, and the conversion of each acquired representation in the respective occupancy grid G is then performed according to each representation acquired for each of the acquisition modules 20.

The acquisition module 20 is configured to acquire at least one representation of the scene from the set 14 of N sensor(s) 16.

When the set 14 comprises several sensors 16, the acquisition module 20 is configured, in particular, to acquire the representations of the scene from the different sensors 16.

In the example of FIG. 3, the set 14 comprises three sensors 16, also referenced C1, C2, C3, and those skilled in the art can also observe that these three sensors C1, C2, C3, whose respective fields of view are each schematically represented in the form of a triangle coming from the corresponding sensor 16 in FIG. 3, making it possible to cover a larger monitoring area than a single sensor 16, even if their fields of view partially overlap.

In the example of FIG. 3, a first sensor C1 is represented in the form of a solid disk, or else black; a second sensor C2 is represented in the form of an empty disk, or white; and a third sensor C3 is shown as a disk with a cross.

In the example of FIG. 4, the acquisition module 20 is then configured to acquire the representation from each of the three sensors C1, C2, C3, in particular the measurements coming from the first sensor C1, represented in the form of black dots in FIG. 4, as well as those coming from the second sensor C2 represented in the form of white dots, and again those from the third sensor C3 represented in the form of disks with a cross.

In the example of FIGS. 3 and 4, the sensors 16, denoted C1, C2, C3, are, for example, each a lidar, and the measurements acquired by the acquisition module 20 then correspond to impact points of each lidar with the object(s) 26 in the scene.

In the example of FIGS. 6 to 9, the set 14 comprises a single sensor 16, such as a lidar, shown in the form of a solid disk, or black. The acquisition module 20 is then configured to acquire all the measurements made by this sensor 16 at each acquisition time instant, FIGS. 6 to 9 corresponding to successive acquisition time instants, and the measurements made being—in the same way—represented by black disks in FIGS. 6 to 9.

The conversion module 22 is configured to convert each acquired representation in the respective occupancy grid G, each zone Z of the occupancy grid G being in an occupied state if the portion of the representation corresponding to this zone Z contains an object 26, and to an unoccupied state, otherwise.

When the set 14 comprises several sensors 16, the conversion module 22 is configured to convert all the acquired representations in the respective occupancy grid G, each zone Z of the occupancy grid G then being in the occupied state if the portion corresponding to this zone Z contains an object 26 for at least one of the acquired representations, and in the unoccupied state, otherwise. In other words, when the set 14 comprises several sensors 16, the conversion module 22 is configured to position the value of a zone Z of the occupancy grid G in the unoccupied state only if the portion corresponding to this zone Z contains no object 26 for all the representations acquired by the acquisition module 20 from the plurality of sensors 16.

Figure 5:
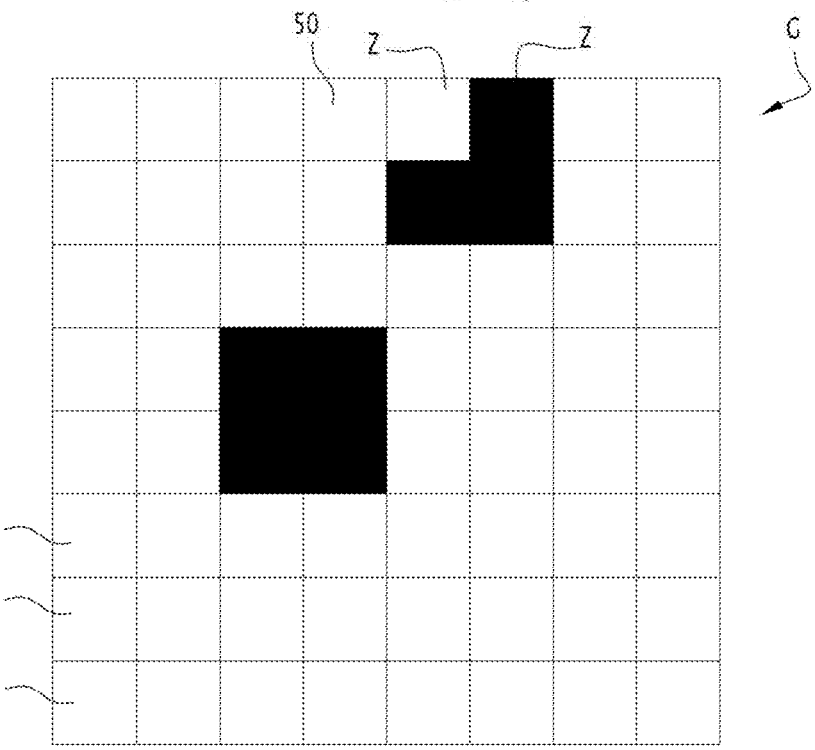

FIG. 5 then illustrates the occupancy grid G obtained from the example of FIG. 4, each zone Z being, for example, in the form of a square, and each zone Z which is in the occupied state being by convention in this example filled in black, each zone in the unoccupied state being filled in white. Those skilled in the art will then observe that the occupancy grid G of FIG. 5 comprises seven zones Z in the occupied state, three first zones Z (forming an inverted L) in the occupied state resulting from the representation of the scene acquired from the second sensor C2, two other zones Z in the occupied state resulting from the representation acquired by the first sensor C1, these zones in the occupied state corresponding to the two upper zones of the square of four zones in FIG. 5, and finally two last zones Z in the occupied state resulting from the representation acquired by the third sensor C3, these two zones in the occupied state corresponding to the lower part of the aforementioned square of four zones.

In a variant or additionally, the conversion module 22 is configured to convert each representation acquired by the different sensors 16 into an intermediate occupancy grid $G^{int}$ for each sensor 16, and then to combine the intermediate occupancy grids $G^{int}$ in the respective occupancy grid G for said scene.

Each zone Z corresponds to a single measuring cell of the corresponding sensor(s) 16, or to a plurality of measuring cells of the corresponding sensor(s) 16. When the sensor 16 is a lidar, or respectively a radar, a measurement cell corresponds, for example, to the measurement resulting from the emission of a lidar beam, or respectively of a radar beam. When the sensor 16 is a stereoscopic camera, the measurement cell corresponds, for example, to a pixel of a matrix photodetector of the camera.

Each zone Z of a occupancy grid $G^{cur}$, $G^{ref}$ or of the differential grid ΔG, then comprises a single cell 50 or an aggregate 24 of several cells 50, each cell 50 corresponding to a respective measuring cell of the corresponding sensor(s) 16.

Figure 13:
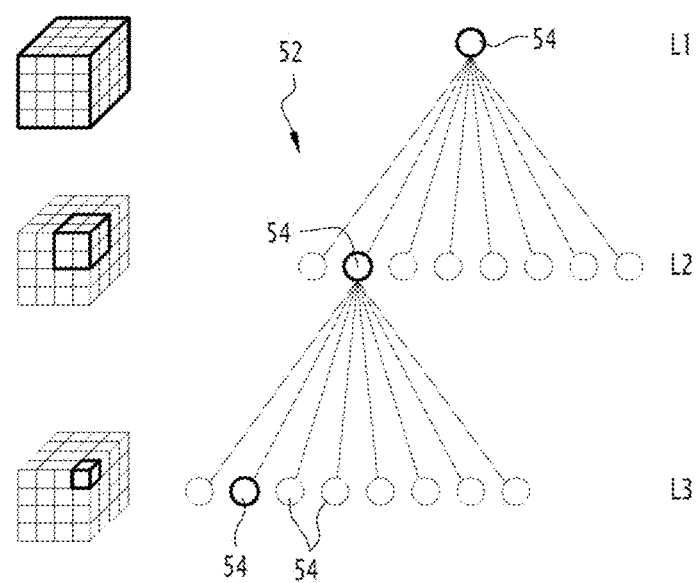

Each occupancy grid $G^{cur}$, $G^{ref}$, as well as the differential grid ΔG, is a multidimensional grid, i.e. a two-dimensional grid, as in the example of FIG. 14, or else a three-dimensional grid as in the example of FIG. 13.

When the grid is a two-dimensional grid, each zone Z is preferably then in the form of a polygon, for example a rectangle or a square, as shown in FIGS. 3 to 12.

Similarly, when the multidimensional grid is a three-dimensional grid, each zone Z is, for example, in the form of a polyhedron, such as a rectangular parallelepiped or a cube.

Each object 26 that can be monitored by the monitoring device 10 and belonging to the scene is, for example, a mobile object, such as a traffic element 44, or a static object, such as a building or an element of vegetation, along a respective traffic lane 42.

Those skilled in the art will understand that "object" generally means any element capable of being detected by a respective electronic sensor 16, i.e. in particular any element capable of reflecting a beam emitted by the sensor 16, whether it is a lidar or a radar, or any element able to be detected by a stereoscopic camera.

The calculation module 28 is configured to calculate the differential grid ΔG corresponding to the difference between the current occupancy grid $G^{cur}$ and the reference occupancy grid $G^{ref}$, in particular by ignoring each zone Z of the occupancy grid of reference $G^{ref}$ which is in the occupied state and for which the corresponding zone Z of the current occupancy grid $G^{cur}$ is in the unoccupied state.

In optional addition, the calculation module 28 is configured to calculate the differential grid ΔG by ignoring each zone Z of the reference occupancy grid $G^{ref}$ for which the corresponding zone Z of the current occupancy grid $G^{cur}$ is in an unoccupied state.

The differential grid ΔG comprises a plurality of zones Z each corresponding to a respective portion of the representation of the scene, each zone Z of the differential grid ΔG being in an active state or in an inactive state.

In optional addition, the calculation module 28 is configured to calculate a respective zone Z of the differential grid ΔG in the active state only if the corresponding zone Z of the current occupancy grid $G^{cur}$ is in the occupied state and if the corresponding zone Z of the reference occupancy grid $G^{ref}$ is in the unoccupied state.

Figure 15:
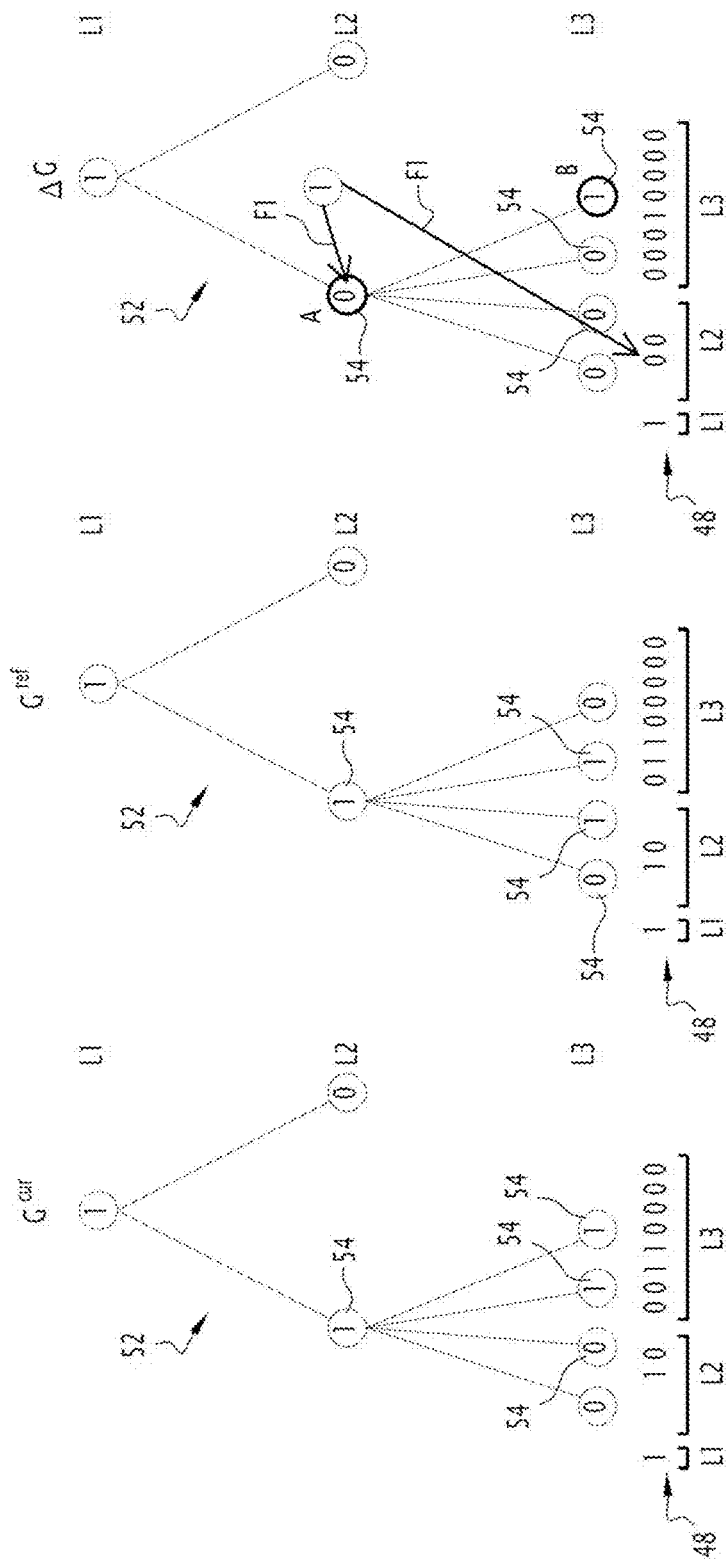
FIG. 15 shows a view illustrating the application of further processing to the differential grid calculated by setting in the active state each parent node having at least one child node in the active state, from the lowest level of the tree to the highest level of the tree.

The occupancy grids $G^{cur}$, $G^{ref}$ and the differential grid ΔG are, for example, each in the form of a bit string 48, each bit being associated with a zone Z or with a respective cell 50, as represented in the example of FIGS. 14 and 15.

In optional addition, the calculation module 28 is, for example, configured to calculate the differential grid ΔG according to Table 1 below:

TABLE 1

| $B^{cur}$ | $B^{ref}$ | ΔB |
|---|---|---|
| 0 | 0 | 0 |
| 0 | 1 | 0 |
| 1 | 0 | 1 |
| 1 | 1 | 0 | where $B^{cur}$ and $B^{ref}$ represent a bit of the current occupancy grid and respectively a corresponding bit of the reference occupancy grid, the bit 0 denoting the unoccupied state and the bit 1 denoting the occupied state, and ΔB represents the bit of the differential grid associated with the respective bits $B^{cur}$ and $B^{ref}$, the bit 0 denoting the idle state and the bit 1 denoting the active state.

As a variant, the calculation module 28 is configured to calculate the differential grid ΔG according to the following equation:

$$\Delta P = \begin{cases} 1 & si P^{cur} - P^{ref} > \beta \\ 0 & \text{otherwise} \end{cases} \quad (1)$$

where $P^{cur}$ and $P^{ref}$ represent a probability that a corresponding Z zone of the current occupancy grid is occupied, and respectively a probability that the same zone Z of the reference occupancy grid is occupied, with $0 \leq P^{cur} 1$ and $0 \leq P^{ref} 1$, ΔP represents the state of said zone Z of the differential grid ΔG associated with the respective probabilities $P^{cur}$ and $P^{ref}$, the value 0 denoting the inactive state and the value 1 denoting the active state, and β is a decimal value strictly between 0 and 1; $0 < \beta < 1$.

According to this variant, the electronic sensor(s) 16 are modeled in a probabilistic manner. Each measurement made by the corresponding sensor 16 is assigned a probability of occupying the corresponding zone Z as a function of the distance from the zone Z to the sensor 16, instead of assigning a binary value, such as 1 for a lidar or radar impact. The probability associated with the measurement made by the sensor 16 is, for example, equal to 1 for an object 26 detected in a zone Z close to the sensor 16, to 0.9 for an object 26 detected in a zone Z a little farther from the sensor 16, to 0.8 for an object 26 detected in a zone Z even further away from the sensor 16, and so on. The probability 0 corresponds to an absence of object detection for the corresponding zone Z. The probability values $P^{cur}$ and $P^{ref}$ are, for example, predefined by successive ranges of distance values between the zone Z and the sensor 16 considered.

The reference occupancy grid $G^{ref}$ is, for example, an occupancy grid resulting from a single representation acquired at a previous time instant, i.e. anterior to that of the current representation associated with the current occupancy grid $G^{cur}$.

In a variant, the reference occupancy grid $G^{ref}$ is an occupancy grid resulting from several representations acquired successively and prior to the current representation associated with the current occupancy grid $G^{cur}$, i.e. acquired at successive time instants and prior to that of the current representation. FIGS. 6 to 9 then illustrate such an example of calculation of the reference occupancy grid $G^{ref}$ by the calculation module 28, FIGS. 6 to 9 corresponding to successive representations of the scene for successive time instants.

According to this variant, the calculation module 28 is then, for example, configured to calculate the reference occupancy grid $G^{ref}$ by averaging several previous occupancy grids G1, G2, G3, G4, each resulting from a representation respectively acquired prior to the current representation associated with the current occupancy grid $G^{cur}$.

In the example of FIGS. 6 to 9, the number of previous occupancy grids taken into account for calculating the reference occupancy grid $G^{ref}$ is equal to 4, namely a first grid G1 (FIG. 6) corresponding to a first acquisition time instant t1, a second grid G2 (FIG. 7) corresponding to a second acquisition time instant t2, after the first acquisition time instant t1, a third grid G3 (FIG. 8) corresponding to a third acquisition time instant t3, subsequent to the first and second acquisition time instants, t1, t2, and finally a fourth grid G4 (FIG. 9) corresponding to a fourth acquisition time instant t4, subsequent to the time instants t1, t2 and t3.

The calculation module 28 is then configured to perform an average of the plurality of previous occupancy grids G1, G2, G3, G4, preferably zone Z by zone Z, as will be explained later in the example of FIGS. 6 to 9 with two zones Z, denoted respectively Z1, Z2.

Figure 6:
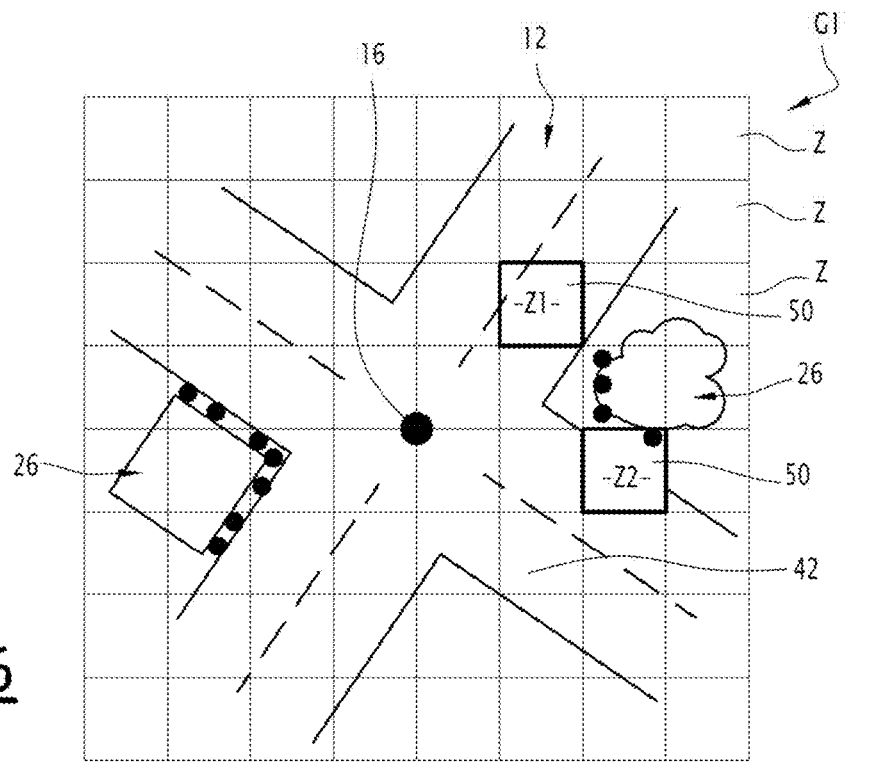
Figure 7:
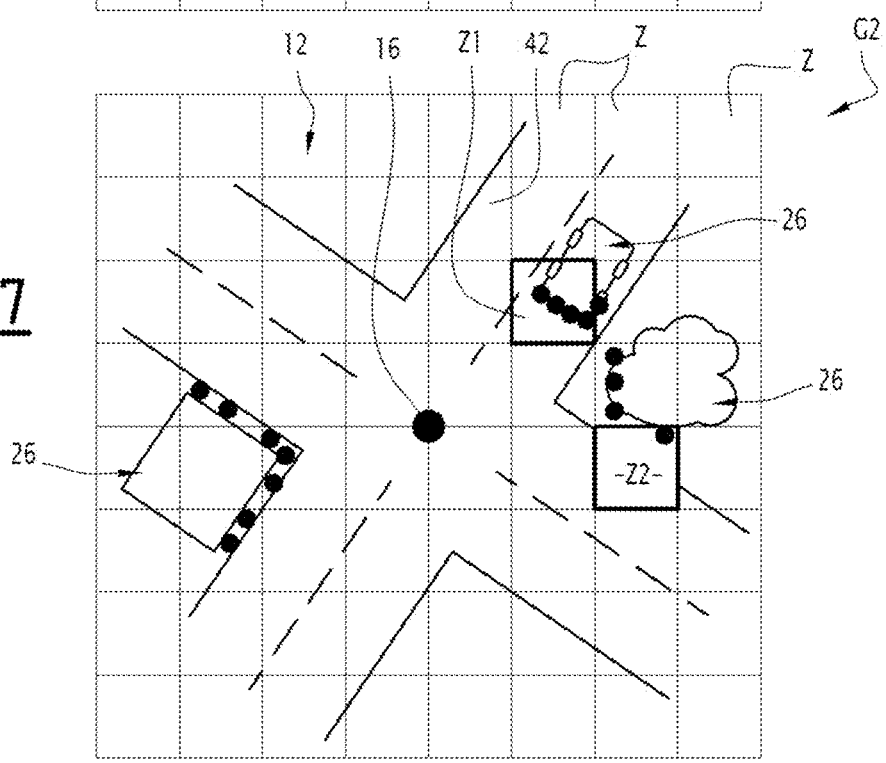

In the example of FIGS. 6 to 9, for the representation acquired at the first time instant t1, visible in FIG. 6, the first zone Z1 has no object 26, while the second zone Z2 comprises a portion of the foliage of a tree, so that for the first prior occupancy grid G1, the first zone Z1 is in the unoccupied state and the second zone Z2 is in the occupied state. For the representation acquired at the second time instant t2, visible in FIG. 7, there is a vehicle is in the portion of the representation corresponding to the first zone Z1, and a portion of the foliage of the tree is still in the representation portion corresponding to the second zone Z2, so that for the second prior occupancy grid G2, the first and second zones Z1, Z2 are each in the occupied state. For the representation corresponding to the third acquisition instant t3, visible in FIG. 8, the vehicle is no longer in the portion corresponding to the first zone Z1, and no other object 26 is detected in this zone, while the foliage of the tree is also no longer in the portion of the representation corresponding to the second zone Z2 and there is no other object 26 there, so that for the third prior occupancy grid G3, the first and second zones Z1, Z2 are each in the unoccupied state. Finally, for the representation corresponding to the fourth acquisition instant t4, visible in FIG. 9, the portion corresponding to the first zone Z1 still has no object 26, while the portion corresponding to the second zone Z2 again comprises a portion of the foliage of the tree. For the fourth preceding occupancy grid G4, the zone Z1 is then in the unoccupied state, while the second zone Z2 is in the occupied state. The states of the first and second zones Z1, Z2 for the different acquisition time instants t1 to t4 are then listed in the following table 2, where the first column is the column of the different acquisition time instants, the second column corresponds to the first zone Z1 while the last column corresponds to the second zone Z2, a zone having, by convention, in this table the value 0 when it is in the unoccupied state and the value 1 when it is in the occupied state.

TABLE 2

| t | Z1 | Z2 |
|---|----|----|
| t1 | 0 | 1 |
| t2 | 1 | 1 |
| t3 | 0 | 0 |
| t4 | 0 | 1 |

The calculation module 28 is then, for example, configured to perform a quadratic average of the different successive states of each zone of the previous occupancy grids, for example according to the following equation:

$$\overline{G}_j = \frac{1}{N} \sum_{i=1}^{N} G_{j,i} \qquad (2)$$

where i is an integer index of value between 1 and N denoting the previous occupancy grid Gi considered, j is an integer index denoting the zone Z considered of the previous occupancy grid Gi considered, N is the previous occupancy grid number Gi considered to calculate the reference occupancy grid $G^{ref}$, Gj,i represents the value, equal to 0 for the unoccupied state or to 1 for the occupied state, of the zone Z of index j of the previous occupancy grid Gi of index i, and $\overline{G}_j$ represents the average value calculated for zone Z of index j.

The calculation module 28 is then configured to determine the binary value, i.e. the state, of the corresponding zone in the reference occupancy grid $G^{ref}$ by comparing the average value obtained for said zone with a first threshold $S_1$, said zone of the reference occupancy grid $G^{ref}$ being, for example, in the occupied state if the average value is greater than said predefined first threshold $S_1$ and in the unoccupied state otherwise, according to the following equation:

$$G_j^{ref} = \begin{cases} 1 & si \overline{G}_j > S_1 \\ 0 & \text{otherwise} \end{cases} \qquad (3)$$

where $\overline{G}_j$ is the average value calculated for zone Z of index j, $S_1$ denotes the first threshold, and $G_j^{ref}$ represents the value calculated for the zone Z of index j of the reference occupancy grid $G^{ref}$, the value 0 corresponding to the unoccupied state and the value 1 to the occupied state.

With an average calculated according to equation (2), the value obtained in the example of FIGS. 6 to 9 is then specified in table 3 below.

TABLE 3

| t | Z1 | Z2 |
|---|----|----|
| t1 | 0 | 1 |
| t2 | 1 | 1 |
| t3 | 0 | 0 |
| t4 | 0 | 1 |
| $\overline{G}_j$ | 0.25 | 0.75 |
| $S_1$ | 0.5 | 0.5 |
| $G_j^{ref}$ | 0 | 1 |

As a variant, the calculation module 28 is configured to perform a weighted average of the states, each represented in the form of a successive binary value of each zone Z of the previous occupancy grids G1 to G4, by applying a weight w, to each successive binary value for the corresponding zone Z, the weight w, preferably having a greater value for the last representations acquired among the plurality of representations acquired successively and prior to the current representation.

The calculation module 28 is then, for example, configured to calculate the average value of each zone according to the following equation:

$$\overline{G}_j = \frac{1}{N} \sum_{i=1}^{N} w_i \cdot G_{j,i} \qquad (4)$$

where i, j, N, Gj,i and $\overline{G}_j$ represent the same variables as previously defined for equation (2), and $w_1$ represents the weight applied to the value Gj,i;

the applied weight $w_1$ satisfying, for example, the following equation:

$$w_i = 1 - \frac{1}{t_i} \qquad (5)$$

The calculation module 28 is then, analogously, configured to calculate the binary value, i.e. the state of each zone Z of the reference occupancy grid $G^{ref}$ by comparing the average and calculated value for the corresponding zone Z with a second threshold $S_2$, said zone of the reference occupancy grid $G^{ref}$ being, for example, in the occupied state if the average value is greater than said predefined second threshold $S_2$ and in the unoccupied state otherwise, according to the following equation:

$$G_j^{ref} = \begin{cases} 1 & si \overline{G}_j > S_2 \\ 0 & \text{otherwise} \end{cases} \qquad (6)$$

where $\overline{G}_j$ is the average value calculated for zone Z of index j, $S_2$ denotes the second threshold, and $G_j^{ref}$ represents the value calculated for the zone Z of index j of the reference occupancy grid $G^{ref}$, the value 0 corresponding to the unoccupied state and the value 1 to the occupied state;

the second threshold $S_2$ satisfying, for example, the following equation:

$$S_2 = \frac{1}{N} \sum_{i=1}^{N} w_i \cdot 0.5 \quad (7)$$

where $w_1$ represents the weight applied to the value $G_{j,i}$.

With an average calculated according to equation (4), the value obtained in the example of FIGS. 6 to 9 is then specified in table 4 below.

TABLE 4

| $t_i$ | $w_i$ | Z1 | Z2 |
|---|---|---|---|
| 1 | 0 | 0 | 1 |
| 2 | 0.5 | 1 | 1 |
| 3 | 0.6 | 0 | 0 |
| 4 | 0.75 | 0 | 1 |
| $\overline{G}_j$ | — | 0.125 | 0.3125 |
| $S_2$ | — | 0.23125 | 0.23125 |
| $G_j^{ref}$ | | 0 | 1 |

This variant then makes it possible to give more importance, in the reference occupancy grid $G^{ref}$, to the representations that have been acquired at the most recent time instants among the different acquired representations considered to calculate said reference occupancy grid $G^{ref}$.

Those skilled in the art will then observe that, in the examples described above with reference to FIGS. 3 to 5 for the conversion of the representations acquired from several sensors 16 in the corresponding occupancy grids $G^{cur}$, $G^{ref}$ on the one hand, and referring to FIGS. 6 to 9 for the calculation of the reference occupancy grid $G^{ref}$, on the other hand, each zone Z considered is a unicellular zone, i.e. a zone Z comprising a single cell 50. Those skilled in the art will then understand that when the zone Z comprises the aggregate 24 of several cells 50, the operations which have previously been described for the unicellular zone Z must then be carried out for the aggregate 24 of cells 50. If there is at least one occupied cell 50 in the aggregate 24, the zone Z corresponding to the aggregate 24 is considered to be occupied. Otherwise, the zone Z corresponding to the aggregate 24 is considered to be free, i.e. unoccupied.

In optional complement, the current occupancy grid $G^{cur}$ and reference grid $G^{ref}$, as well as the differential grid $\Delta G$, are each represented in the form of a tree 52, visible in FIG. 13, each tree 52 comprising a plurality of nodes 54 distributed into several levels L1, L2, L3, each node 54 corresponding to a respective zone Z, a child node being connected to a single upper level parent node.

In the example of FIG. 13, the highest level is a first level L1, while the tree 52 further comprises a second level L2 corresponding to an intermediate level, and a third level L3 corresponding to the lowest level. In this example of FIG. 13, each node 54 of the lowest level L3 is thus connected to a single parent node of higher level, i.e. of the second level L2, and in an analogous manner, each node 54 of the second level L2 is connected to a single parent node of higher level, i.e. node 54 of the first level L1.

The tree 52 has several levels L1, L2, L3, and preferably three levels, as in the example of FIGS. 13 to 15.

With the representation in the form of the tree 52, each node 54 of the lowest level L3 preferably corresponds to a single respective cell 50.

The representation in the form of the tree 52 of FIG. 13 is also known by the name octree, and is, for example, described in the article entitled "*Octree encoding: A new technique for the representation, manipulation and display of arbitrary 3D objects by computer*" by Donald J R Meagher, published October 1980 in Image Processing Laboratory.

Those skilled in the art will then observe that the representation octree can represent both a three-dimensional volume as shown in FIG. 13, where each volume surrounded in bold is associated with the node 54 surrounded in bold in the corresponding tree 52, or a surface as shown in FIG. 14.

The calculation module 28 is preferably configured to calculate the differential grid $\Delta G$ by comparing zones Z of identical scale for the current occupancy grid $G^{cur}$ and the reference occupancy grid $G^{ref}$, but the compared zones Z do not necessarily have the same resolution, i.e. the same number of cells 50, between the current occupancy grid $G^{cur}$ and the reference occupancy grid $G^{ref}$. An identical scale between the two zones Z corresponds, for example, to an identical level among the levels L1, L2, L3 of the tree 52 for these two zones Z.

Figure 10:
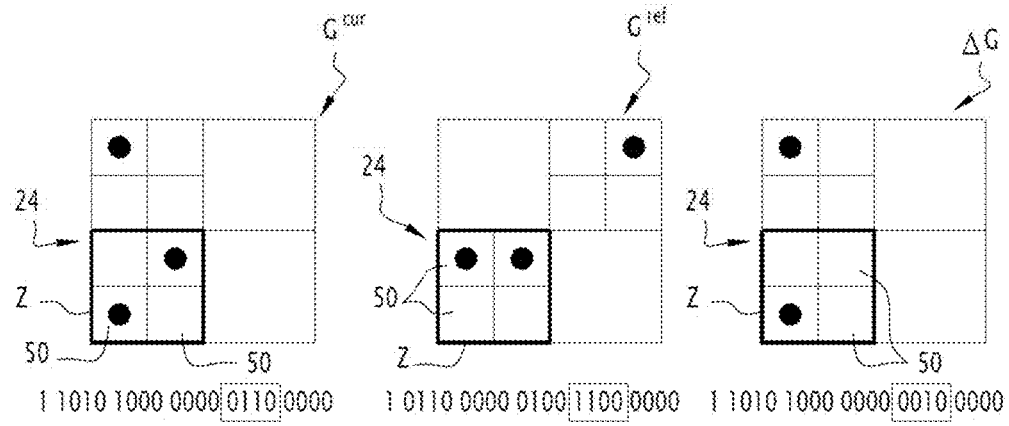
FIGS. 10 to 12 show schematic views illustrating the calculation of a differential grid corresponding to the difference between the current occupancy grid and the reference occupancy grid, for different examples of current occupancy and reference grids.
Figure 11:
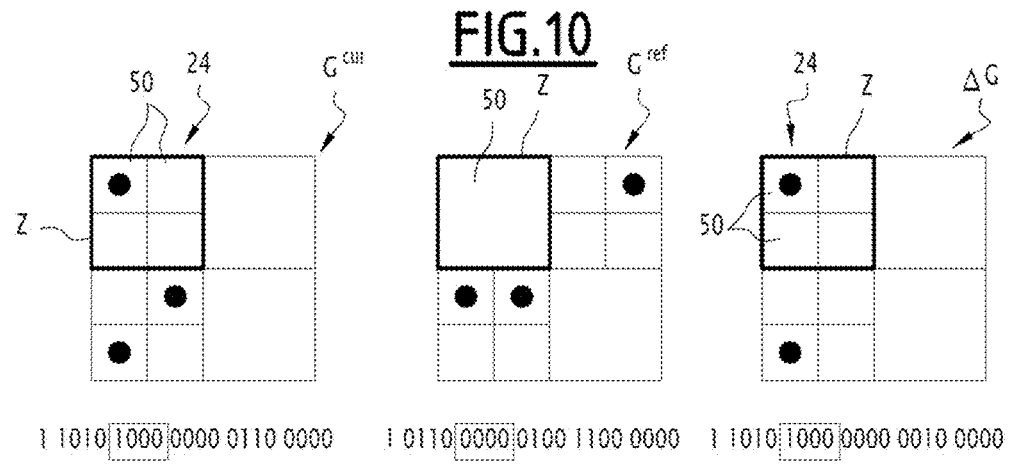
Figure 12:
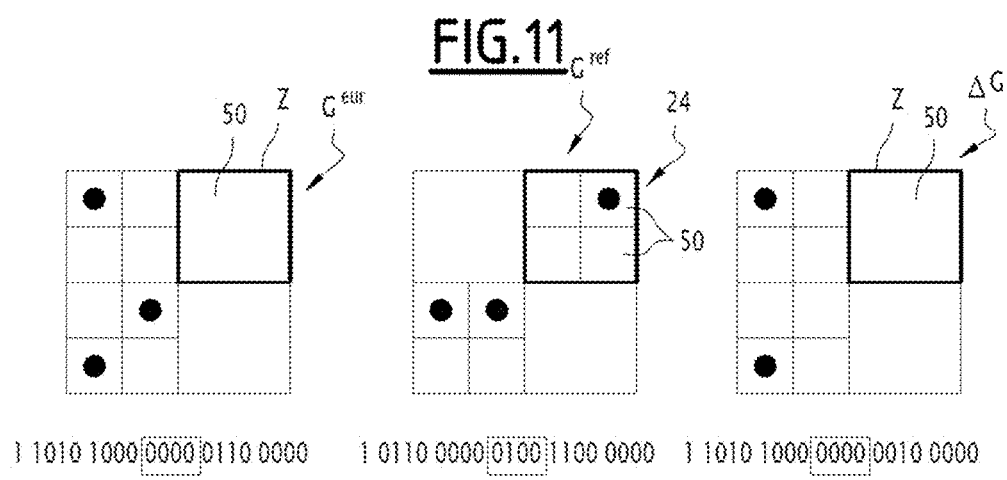

FIGS. 10 to 12 then illustrate the three possible cases, with FIG. 10 corresponding to the case where the resolution of the zone Z of the current occupancy grid $G^{cur}$ is identical to that of the zone Z of the reference occupancy grid $G^{ref}$, FIG. 11 corresponding to the case where the resolution of the zone Z of the current occupancy grid $G^{cur}$ is greater than that of the zone Z of the reference occupancy grid $G^{ref}$, and finally FIG. 12 corresponding to the case where the resolution of the zone Z of the current occupancy grid $G^{cur}$ is less than that of the zone Z of the reference occupancy grid $G^{ref}$.

When the resolution of the zone Z of the current occupancy grid $G^{cur}$ and that of the zone Z of the reference occupancy grid $G^{ref}$ are identical, the calculation of the differential grid $\Delta G$ follows from the above, with a calculation effected by comparing cells 50 one by one, for example according to Table 1 or Equation (1).

When the resolution of the zone Z of the current occupancy grid $G^{cur}$ is distinct from that of the zone Z of the reference occupancy grid $G^{ref}$, as in the example of FIGS. 11 and 12, the calculation module 28 is, for example, configured to represent each zone Z of the reference occupancy grid $G^{ref}$ and the current occupancy grid $G^{cur}$ in the form of a coding, where the number of bits is identical for the zone Z of the current occupancy grid $G^{cur}$ and for that of the of reference occupancy grid $G^{ref}$. In the example of FIGS. 11 and 12, each zone Z considered, surrounded by a box in bold, is then represented in the form of a four-bit coding, as illustrated with the bits in bold.

In this example, the calculation module 28 is then configured to perform the calculation of the differential grid $\Delta G$ by determining the resulting state of each zone Z of the differential grid $\Delta G$ by a bit-by-bit calculation, i.e. cell 50 by cell 50.

In the example of FIG. 11, the upper left cell of the zone Z of the differential grid $\Delta G$ is thus in the active state, since the corresponding cell of the current occupancy grid $G^{cur}$ is in the occupied state, while the associated bit of the reference occupancy grid for this zone Z is in the unoccupied state, which then corresponds to the third row of Table 1 above, or to the first condition of the previous equation (1).

Similarly, in the example of FIG. 12, the resulting zone Z of the differential grid $\Delta G$ is in the inactive state, since all the bits of the component are themselves in the inactive state. In particular, in the case of the cell at the top right of the zone Z of the reference occupancy grid $G^{ref}$, the bit resulting from the zone Z of the differential grid $\Delta G$ is in the inactive state, since the corresponding bit of the zone Z of the current occupancy grid $G^{cur}$ is in the unoccupied state, while that of the zone Z of the reference occupancy grid $G^{ref}$ is in the occupied state, which corresponds then to the second row of Table 1 above, or to the second condition of Equation (1) above.

The calculation module 28 is preferably configured to use the representation 52, as represented in FIG. 14, with the associated bit string 48, to code each zone Z of the current occupancy grids $G^{cur}$ and reference grid $G^{ref}$, as well as the differential grid ΔG. Those skilled in the art will furthermore observe that the nodes 54 of the lowest level L3 correspond in the example of FIG. 14 to a cell 50, and even if a respective zone Z comprises a single cell, then its representation in the form of nodes 54 and bits is identical to that of the other zones Z having the largest number of cells 50 so as to calculate, as explained above, the differential grid ΔG despite the differences in resolution between the zones Z compared. In the example of FIG. 14, two Z zones then comprise a single cell 50 while being represented in the form of four nodes 54, and of four associated bits in the bit string 48, this four-bit separation of the two Z zones being represented in the form of dashed lines in FIG. 14 in order to facilitate the explanation, even if the zone Z comprises a single cell 50.

In optional addition, the calculation module 28 is further configured to apply subsequent processing to the calculated differential grid ΔG by setting in the active state each parent node 54 having at least one child node in the active state, from the lowest level L3 to the highest level L1.

In the example of FIG. 15, at the end of the calculation carried out using Table 1, or again from Equation (1), the node 54 marked by the letter A has the differential grid ΔG with the value 0 corresponding to the inactive state, since the nodes 54 corresponding to the current occupancy grid $G^{cur}$ and to the reference grid $G^{ref}$ each have the value 1 corresponding to an occupied state, the resulting unoccupied state for the node A of the differential grid ΔG then arising from the fourth row of Table 1, or the second condition of Equation (1). Similarly, the node 54, denoted by B, of the differential grid ΔG is in the active state, corresponding to the value 1, since the corresponding node 54 of the current occupancy grid $G^{cur}$ is in the occupied state (value 1) and that of the reference occupancy grid $G^{ref}$ is in the unoccupied state (value 0), which corresponds to the third row of Table 1, or to the first condition of Equation (1). In this case where the node A (parent node of the node B) is initially in the inactive state, corresponding to the value 0, while this child node B is in the active state corresponding to the value 1, the subsequent processing applied then consists in positioning the parent node A in the active state (value 1), as represented by the arrow F1.

The detection module 30 is then configured to detect a change in the scene, from the differential grid ΔG calculated by the calculation module 28.

The detection module 30 is, for example, configured to detect the appearance of an object 26 in the scene when a corresponding zone Z of the differential grid ΔG is in the active state.

In addition, the transceiver 38 is able to receive from a respective vehicle, such as an autonomous motor vehicle 40, additional positioning and/or dimensional information, the conversion module 22 being then configured to use this additional positioning and/or dimensional information in order to complete and/or corroborate the content of at least part of a corresponding occupancy grid $G^{cur}$, $G^{ref}$. This additional positioning and/or dimensional information comprises, for example, a geographical position of the respective vehicle and/or dimensions of the respective vehicle. The geographical position of the vehicle is then, after a possible change of marker, used as an occupied state of the corresponding zone Z. The conversion module 22 is configured to further calculate, from the dimensions of the vehicle, a number of zones Z in the occupied state around said zone Z corresponding to the geographical position. In addition or alternatively, the conversion module 22 is configured to exclude the Z zone occupied by the vehicle(s) during the calculation of the reference occupancy grid $G^{ref}$, the vehicles being dynamic objects preferably being taken into account in the reference occupancy grid $G^{ref}$.

Each traffic element 44 is an element able to circulate and/or to cross a respective lane 42. Each traffic element 44 is, in particular, an element capable of being in the scene. Each traffic element 44 is, for example, selected from the group consisting of: a motorized vehicle, a non-motorized vehicle, a pedestrian and an animal.

Figure 2:
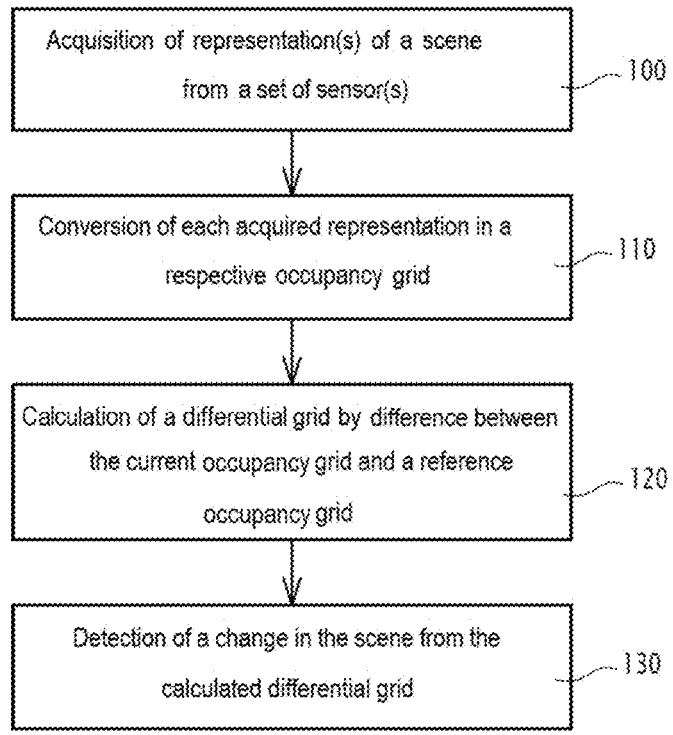
FIG. 2 shows a flowchart of a method according to the invention, of monitoring the scene via a set of electronic sensors.

The operation of the electronic monitoring device 10 according to the invention will now be explained with the aid of FIG. 2 representing a flowchart of the method according to the invention, of monitoring the scene, the method being implemented by the electronic monitoring device 10.

During an initial step 100, the electronic monitoring device 10 acquires, via its acquisition module 20, the scene or representations of the scene from the set 14 of N electronic sensor(s) 16.

The monitoring device 10 then converts, in the next step 110 and via its conversion module 22, the acquired representation(s) into a respective occupancy grid $G^{cur}$, $G^{ref}$.

When the set 14 comprises several electronic sensors 16, the conversion of the different acquired representations into the occupancy grid $G^{cur}$, $G^{ref}$ respectively, is carried out as described previously with reference to FIGS. 3 to 5.

In the next step 120, the electronic monitoring device 10 then calculates, via its calculation module 28, the differential grid ΔG by the difference between the current occupancy grid $G^{cur}$ and the reference occupancy grid $G^{ref}$. The calculation of this differential grid is, for example, carried out using Table 1 above, or else Equation (1).

In optional addition, during this step 120, prior to the calculation of the differential grid ΔG, the calculation module 28 calculates the reference occupancy grid $G^{ref}$ if necessary, i.e. if no reference occupancy grid $G^{ref}$ has yet been calculated or if the reference occupancy grid $G^{ref}$ needs to be updated. The calculation of the reference occupancy grid $G^{ref}$ is, for example, carried out from several previous occupancy grids G1 to G4, corresponding to several representations successively acquired and prior to the current representation associated with the current occupancy grid $G^{cur}$, as previously described with reference to FIGS. 6 to 9.

The calculation module 28 is also able to calculate the differential grid ΔG as well in the case where the corresponding zones Z of the current occupancy grid $G^{cur}$ and reference occupancy grid $G^{ref}$ have the same resolution, as in the case where they have resolutions as explained above with respect to FIGS. 10 to 12.

As a further optional addition, the calculation module 28 applies the subsequent processing to the differential grid ΔG calculated by setting in the active state each parent node having at least one child node in the active state, from the lowest level L3 to the highest level, L1 as illustrated in FIG. 15.

The electronic monitoring device 10 finally detects, in the next step 130 and via its detection module 30, a possible change in the scene, from the differential grid ΔG calculated in step 120. The detection module 30 detects, in particular, the appearance of an object 26 in the scene when a corresponding zone Z of the differential grid ΔG is in the active state.

Thus, the electronic monitoring device 10 according to the invention makes it possible to detect a change in the scene more quickly via the use, on the one hand, of the current occupancy grid $G^{cur}$ for the current representation of the scene, and on the other hand, of the reference occupancy grid $G^{ref}$ for the reference representation of the scene, i.e. of the background to which the current representation of the scene must be compared, then via the calculation of the differential grid ΔG.

The calculation of the differential grid ΔG is performed, in particular, by ignoring each zone Z of the reference occupancy grid $G^{ref}$ in the occupied state for which the corresponding zone Z of the current occupancy grid $G^{cur}$ is in the unoccupied state, which makes it possible to more effectively detect a change in the scene observed by the electronic sensor(s) 16, and, in particular, to reduce the associated calculation time.

What is claimed is:

1. An electronic device for monitoring a scene via a set of N electronic sensor(s), where N is an integer greater than or equal to 1, the device being intended to be connected to the set of N sensor(s) and comprising:
    an acquisition module configured to acquire, from the set of N sensor(s), at least one representation of the scene,
    a conversion module configured to convert each acquired representation into a respective occupancy grid, each occupancy grid comprising a plurality of zones each corresponding to a respective portion of the representation, each zone of the occupancy grid being in an occupied state if said portion contains an object and in an unoccupied state otherwise,
    a calculation module configured to calculate a differential grid corresponding to a difference between a current occupancy grid and a reference occupancy grid, by ignoring each zone of the reference occupancy grid which is in the occupied state and for which the corresponding zone of the current occupancy grid is in the unoccupied state, and
    a detection module configured to detect a change in the scene from the calculated differential grid,
    wherein the differential grid comprises a plurality of zones each corresponding to a respective portion of the representation of the scene, each zone of the differential grid being in an active state or an inactive state, the detection module being configured to detect the appearance of an object in the scene when a corresponding zone of the differential grid is in the active state, and
    wherein the occupancy grids and the differential grid are each in the form of a bit string, each bit being associated with a respective zone, and
    the calculation module is configured to calculate the differential grid according to the following table:

| $B^{cur}$ | $B^{ref}$ | ΔB |
|---|---|---|
| 0 | 0 | 0 |
| 0 | 1 | 0 |
| 1 | 0 | 1 |
| 1 | 1 | 0 | where $B^{cur}$ and $B^{ref}$ represent a bit of the current occupancy grid and respectively a corresponding bit of the reference occupancy grid, the bit 0 denoting the unoccupied state and the bit 1 denoting the occupied state, and
    ΔB represents the bit of the differential grid associated with the respective bits $B^{cur}$ and $B^{ref}$, the bit 0 denoting the inactive state and the bit 1 denoting the active state.

2. The device according to claim 1, wherein the calculation module is configured to calculate the differential grid by ignoring each zone of the reference occupancy grid for which the corresponding zone of the current occupancy grid is in the unoccupied state.

3. The device according to claim 1, wherein the calculation module is configured to calculate a respective zone of the differential grid in the active state only if the corresponding zone of the current occupancy grid is in the occupied state and if the corresponding zone of the reference occupancy grid is in the unoccupied state.

4. The device according to claim 1, wherein the occupancy grids and the differential grid are each represented in the form of a tree, each tree having a plurality of nodes distributed into several levels, each node corresponding to a respective zone, a child node being connected to a single parent node of higher level, and
    the calculation module is further configured to apply subsequent processing to the calculated differential grid by setting in active state each parent node having at least one child node in the active state, from the lowest level 1 to the highest level.

5. The device according to claim 1, wherein the reference occupancy grid is an occupancy grid resulting from several representations acquired successively and prior to the current representation associated with the current occupancy grid.

6. The device according to claim 5, wherein the reference occupancy grid is an average of several previous occupancy grids, each resulting from a respective representation acquired prior to the current representation associated with the current occupancy grid.

7. The device according to claim 1, wherein N is an integer greater than or equal to 2, and the acquisition module is configured to acquire, from each sensor, at least one representation of the scene, and the conversion module being configured to convert the acquired representations of the different sensors into the respective occupancy grid for said scene.

8. The device according to claim 7, wherein the conversion module is configured for converting each acquired representation in an intermediate occupancy grid for each sensor and to combine the intermediate occupancy grids in the respective occupancy grid for said scene.

9. A monitoring method for monitoring a scene via a set of N electronic sensor(s), where N is an integer greater than or equal to 1, the method being implemented by an electronic monitoring device intended to be connected to the set of N sensor(s), and comprising:
    acquiring, from the set of N sensor(s), at least one representation of the scene,
    converting each acquired representation into a respective occupancy grid, each occupancy grid comprising a plurality of zones each corresponding to a respective portion of the representation, each zone of the occupancy grid being in an occupied state if said portion contains an object and in an unoccupied state otherwise,
    calculating a differential grid corresponding to a difference between a current occupancy grid and a reference occupancy grid, by ignoring each zone of the reference occupancy grid which is in the occupied state and for which the corresponding zone of the current occupancy grid is in the unoccupied state, and detecting a change in the scene from the calculated differential grid, wherein the differential grid comprises a plurality of zones each corresponding to a respective portion of the representation of the scene, each zone of the differential grid being in an active state or an inactive state, the step of detecting comprises detecting an appearance of an object in the scene when a corresponding zone of the differential grid is in the active state, and wherein the occupancy grids and the differential grid are each in the form of a bit string, each bit being associated with a respective zone, and the step of calculating comprises calculating the differential grid according to the following table:

| $B^{cur}$ | $B^{ref}$ | $\Delta B$ |
|---|---|---|
| 0 | 0 | 0 |
| 0 | 1 | 0 |
| 1 | 0 | 1 |
| 1 | 1 | 0 | where $B^{cur}$ and $B^{ref}$ represent a bit of the current occupancy grid and respectively a corresponding bit of the reference occupancy grid, the bit 0 denoting the unoccupied state and the bit 1 denoting the occupied state, and $\Delta B$ represents the bit of the differential grid associated with the respective bits $B^{cur}$ and $B^{ref}$, the bit 0 denoting the inactive state and the bit 1 denoting the active state.

10. An electronic device for monitoring a scene via a set of N electronic sensor(s), where N is an integer greater than or equal to 1, the device being intended to be connected to the set of N sensor(s) and comprising:

an acquisition module configured to acquire, from the set of N sensor(s), at least one representation of the scene, a conversion module configured to convert each acquired representation into a respective occupancy grid, each occupancy grid comprising a plurality of zones each corresponding to a respective portion of the representation, each zone of the occupancy grid being in an occupied state if said portion contains an object and in an unoccupied state otherwise, a calculation module configured to calculate a differential grid corresponding to a difference between a current occupancy grid and a reference occupancy grid, by ignoring each zone of the reference occupancy grid which is in the occupied state and for which the corresponding zone of the current occupancy grid is in the unoccupied state, and a detection module configured to detect a change in the scene from the calculated differential grid, wherein the differential grid comprises a plurality of zones each corresponding to a respective portion of the representation of the scene, each zone of the differential grid being in an active state or an inactive state, the detection module being configured to detect the appearance of an object in the scene when a corresponding zone of the differential grid is in the active state, and wherein the calculation module is configured to calculate the differential grid according to the following equation:

$$\Delta P = \begin{cases} 1 & \text{if } P^{cur} - P^{ref} > \beta \\ 0 & \text{otherwise} \end{cases}$$

where $p^{cur}$ and $p^{ref}$ represent a probability that a corresponding zone of the current occupancy grid is occupied, and respectively a probability that said zone of the reference occupancy grid is occupied, with $0 \leq p^{cur} \leq 1$ and $0 \leq p^{ref} \leq 1$, $\Delta P$ represents the state of said zone of the differential grid associated with the respective probabilities $p^{cur}$ and $p^{ref}$, the value 0 denoting the inactive state and the value 1 denoting the active state, and $\beta$ is a decimal value strictly between 0 and 1; $0 < \beta < 1$.

11. A monitoring method for monitoring a scene via a set of N electronic sensor(s), where N is an integer greater than or equal to 1, the method being implemented by an electronic monitoring device intended to be connected to the set of N sensor(s), and comprising:

acquiring, from the set of N sensor(s), at least one representation of the scene, converting each acquired representation into a respective occupancy grid, each occupancy grid comprising a plurality of zones each corresponding to a respective portion of the representation, each zone of the occupancy grid being in an occupied state if said portion contains an object and in an unoccupied state otherwise, calculating a differential grid corresponding to a difference between a current occupancy grid and a reference occupancy grid, by ignoring each zone of the reference occupancy grid which is in the occupied state and for which the corresponding zone of the current occupancy grid is in the unoccupied state, and detecting a change in the scene from the calculated differential grid, wherein the differential grid comprises a plurality of zones each corresponding to a respective portion of the representation of the scene, each zone of the differential grid being in an active state or an inactive state, the step of detecting comprises detecting an appearance of an object in the scene when a corresponding zone of the differential grid is in the active state, and wherein the step of calculating comprises calculating the differential grid according to the following equation:

$$\Delta P = \begin{cases} 1 & \text{if } p^{cur} - p^{ref} > \beta \\ 0 & \text{otherwise} \end{cases}$$

where $p^{cur}$ and $p^{ref}$ represent a probability that a corresponding zone of the current occupancy grid is occupied, and respectively a probability that said zone of the reference occupancy grid is occupied, with $0 \leq p^{cur} \leq 1$ and $0 \leq p^{ref} \leq 1$, $\Delta P$ represents the state of said zone of the differential grid associated with the respective probabilities $p^{cur}$ and $p^{ref}$, the value 0 denoting the inactive state and the value 1 denoting the active state, and $\beta$ is a decimal value strictly between 0 and 1; $0 < \beta < 1$.

* * * * *